United States Patent
Patil et al.

(10) Patent No.: US 12,535,223 B2
(45) Date of Patent: Jan. 27, 2026

(54) CHAMBERED AIR FLOW DEFLECTOR FOR A DOOR OF A COOKING OVEN

(71) Applicant: WHIRLPOOL CORPORATION, Benton Harbor, MI (US)

(72) Inventors: Ajit Maruti Patil, Tasgaon Sangli (IN); Jeevan Madhukar Yadav, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 368 days.

(21) Appl. No.: 18/324,364

(22) Filed: May 26, 2023

(65) Prior Publication Data

US 2024/0392973 A1    Nov. 28, 2024

(51) Int. Cl.
*F24C 15/04*    (2006.01)
*F24C 14/02*    (2006.01)
*F24C 15/00*    (2006.01)
*F24C 15/34*    (2006.01)

(52) U.S. Cl.
CPC .......... *F24C 15/006* (2013.01); *F24C 14/02* (2013.01); *F24C 15/34* (2013.01)

(58) Field of Classification Search
CPC ........ F24C 15/04; F24C 15/006; F24C 15/34; F24C 14/02; H05N 6/6414
See application file for complete search history.

(56) References Cited

U.S. PATENT DOCUMENTS

| | | | | |
|---|---|---|---|---|
| 3,749,081 A | * | 7/1973 | Wilson | F24C 15/04 126/200 |
| 4,033,322 A | * | 7/1977 | Seidel | F24C 15/04 126/200 |
| 4,113,439 A | * | 9/1978 | Ookubo | F24C 15/025 99/332 |
| 5,441,036 A | * | 8/1995 | Mikalauskas, II | F24C 15/006 126/200 |
| 7,708,007 B2 | | 5/2010 | Kim et al. | |
| 7,856,973 B2 | | 12/2010 | Kim et al. | |
| 9,377,204 B2 | | 6/2016 | Plevacova et al. | |
| 9,772,112 B2 | | 9/2017 | Raggi et al. | |
| 9,784,457 B2 | | 10/2017 | Oh et al. | |

(Continued)

FOREIGN PATENT DOCUMENTS

DE   102008042470 A1   4/2010
EP   2627951 B1   6/2016

(Continued)

*Primary Examiner* — Ko-Wei Lin
(74) *Attorney, Agent, or Firm* — Price Heneveld LLP

(57) ABSTRACT

A cooking oven includes (A) a cabinet defining a cooking cavity; (B) a door coupled to the cabinet, the door movable to, from, and between (1) a closed position and (2) an open position, the door including: (a) multiple layered glass panels, each separated by a space, the multiple glass panels including a terminal glass panel that is disposed closest to an external environment and furthest from a cooking cavity when the door is in the closed position, and (b) a deflector coupled to the terminal glass panel, the deflector disposed above the spaces to deflect upward flowing air exiting the spaces, the deflector including (i) a top wall, (ii) a bottom wall opposing top edges of the multiple glass panels, (iii) a chamber defined at least in part by the top wall, the bottom wall, and the terminal glass panel, and (iv) apertures into the chamber.

19 Claims, 13 Drawing Sheets

(56) References Cited

U.S. PATENT DOCUMENTS

| | | |
|---|---|---|
| 10,260,756 B2 | 4/2019 | Danzer et al. |
| 10,398,260 B2 | 9/2019 | Park et al. |
| 10,502,431 B2 | 12/2019 | Lee |
| 10,648,676 B2 | 5/2020 | Lee |
| 2007/0125760 A1* | 6/2007 | Kim .................. F24C 15/04 219/391 |
| 2007/0131220 A1* | 6/2007 | Kim .................. H05B 6/642 126/273 R |
| 2007/0158340 A1* | 7/2007 | Kim .................. F24C 15/04 126/198 |
| 2015/0020792 A1 | 1/2015 | Raggi et al. |
| 2015/0107575 A1* | 4/2015 | Plevacova ............... C03C 3/087 126/200 |
| 2016/0033142 A1 | 2/2016 | Oh et al. |
| 2016/0033143 A1 | 2/2016 | Lee |
| 2017/0208652 A1* | 7/2017 | Luckhardt ................ G06T 7/55 |
| 2017/0261213 A1 | 9/2017 | Park et al. |
| 2017/0336077 A1* | 11/2017 | Dänzer .................. F24C 15/04 |
| 2018/0187900 A1* | 7/2018 | Ivanovic ............... F24C 15/006 |
| 2018/0224130 A1* | 8/2018 | Lee ...................... F24C 15/006 |
| 2019/0234619 A1* | 8/2019 | Lee ...................... F24C 15/006 |
| 2021/0215345 A1* | 7/2021 | Lee ...................... F24C 15/006 |
| 2023/0160577 A1* | 5/2023 | Lee .................... A47J 37/0641 126/273 R |

FOREIGN PATENT DOCUMENTS

| | | |
|---|---|---|
| EP | 2469180 B1 | 12/2016 |
| EP | 2333424 B1 | 9/2018 |
| EP | 2459935 B1 | 10/2019 |
| KR | 20050035776 A | 4/2005 |

\* cited by examiner

CHAMBERED AIR FLOW DEFLECTOR FOR A DOOR OF A COOKING OVEN

BACKGROUND OF THE DISCLOSURE

The present disclosure generally relates to an air flow deflector of a door of a cooking oven, and more specifically, to an air flow deflector that increases heat transfer from the door to air flowing through the door.

Some cooking ovens offer a pyrolytic self-cleaning operation. The pyrolytic self-cleaning operation entails elevating the temperature of air within the oven cavity to an elevated temperature (e.g., 430° C. or higher) for a prolonged period of time (e.g., several hours). The high air temperature causes food debris within the oven cavity to break down into ash. The ash is then easily removed from the oven cavity by the user.

However, the door to the oven cavity, especially at the top edge near where hot air is vented, can increase in temperature during the pyrolytic self-cleaning operation. This rise in temperature can arise even when the door includes multiple layers of glass panels with cooling air flowing between the glass panels.

SUMMARY OF THE DISCLOSURE

The present disclosure addresses that rise in temperature with a deflector for the air flow that is disposed on a rear primary surface of the glass panel disposed closest to the external environment. The deflector has a top wall that is flush with the top edge of the glass panel and concavely curved or faceted. Those features minimize the generation of turbulence in the cooling air flow out to the external environment. Further, the deflector is chambered, with the top wall of the deflector, a bottom wall of the deflector, and the rear primary surface of the glass panel bounding the chamber(s), and has apertures into the chamber(s). The cooling air flows into the chamber and withdraws heat from the glass panel, thus reducing the temperature of the glass panel including at the top edge thereof.

According to one aspect of the present disclosure, a cooking oven comprises (A) a cabinet defining a cooking cavity; (B) a door coupled to the cabinet, the door movable to, from, and between (1) a closed position that denies access to the cooking cavity from an external environment and (2) an open position that allows access to the cooking cavity from the external environment, the door comprising: (a) multiple glass panels disposed in a layered orientation and with each adjacent glass panel separated by a space, the multiple glass panels comprising a terminal glass panel that is disposed closest to the external environment and furthest from the cooking cavity when the door is in the closed position, and (b) a deflector coupled to the terminal glass panel, the deflector disposed above the spaces between the multiple glass panels when the door is in the closed position to deflect air exiting the space after flowing upward within the spaces, the deflector comprising (i) a top wall, (ii) a bottom wall opposing the top wall and separated from the top wall by a vertical distance, the bottom wall additionally opposing top edges of the multiple glass panels disposed rearward of the terminal glass panel, (iii) a chamber defined at least in part by the top wall, the bottom wall, and the terminal glass panel, and (iv) apertures into the chamber.

According to another aspect of the present disclosure, a cooking oven comprises: (I) a cabinet defining a cooking cavity; and (II) a door coupled to the cabinet, the door movable to, from, and between (i) a closed position that denies access to the cooking cavity from an external environment and (ii) an open position that allows access to the cooking cavity from the external environment, and the door comprising: (A) multiple glass panels disposed in a layered orientation and with adjacent glass panels separated by a space, the multiple glass panels comprising a terminal glass panel that is disposed closest to the external environment and furthest from the cooking cavity when the door is in the closed position, and (B) a deflector coupled to the terminal glass panel, the deflector disposed above the spaces between the multiple glass panels when the door is in the closed position to deflect air exiting the space after flowing upwards within the spaces, the deflector comprising (i) a top wall that provides a top surface that is concavely arcuate or has breaks in slope that are collectively concave and (ii) a bottom wall opposing the top wall and separated from the top wall by a vertical distance, the bottom wall additionally opposing top edges of the multiple glass panels disposed rearward of the terminal glass panel.

These and other features, advantages, and objects of the present disclosure will be further understood and appreciated by those skilled in the art by reference to the following specification, claims, and appended drawings.

Figure 1:
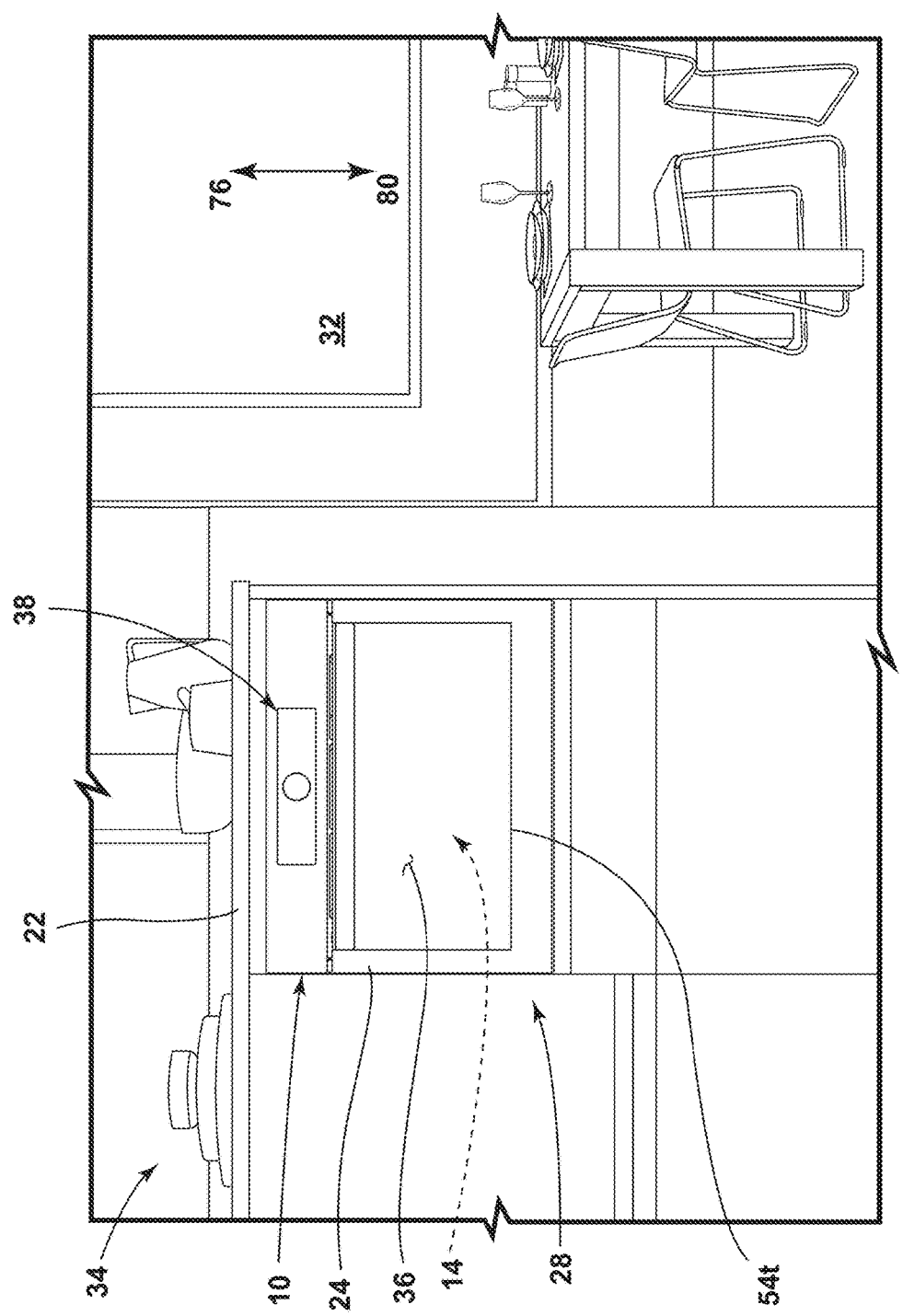
FIG. 1 is a perspective view of a kitchen, illustrating a cooking oven of the present disclosure recessed into cabinetry but with a door exposed to an external environment.

The components in the figures are not necessarily to scale, emphasis instead being placed upon illustrating the principles described herein.

DETAILED DESCRIPTION

The present illustrated embodiments reside primarily in combinations of method steps and apparatus components related to a deflector of air flow for a door of a cooking oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-4, reference numeral 10 generally designates a cooking oven. The cooking oven 10 includes a cabinet 12. The cabinet 12 provides a cooking cavity 14. The cooking cavity 14 accepts a food item 16 for a cooking operation. The cooking oven 10 can be configured with appropriate components (e.g., heating elements 18, a fan 20, a magnetron (not separately illustrated), and so on) to perform the cooking operation of any type, such as baking, roasting, broiling, grilling, convection, or microwave, or combinations thereof. The cooking oven 10 can be a stand-alone unit such as a range oven or a countertop oven. The cooking oven 10 can be a built-in unit (as illustrated) where the cabinet 12 is recessed into cabinetry 22.

Figure 2:
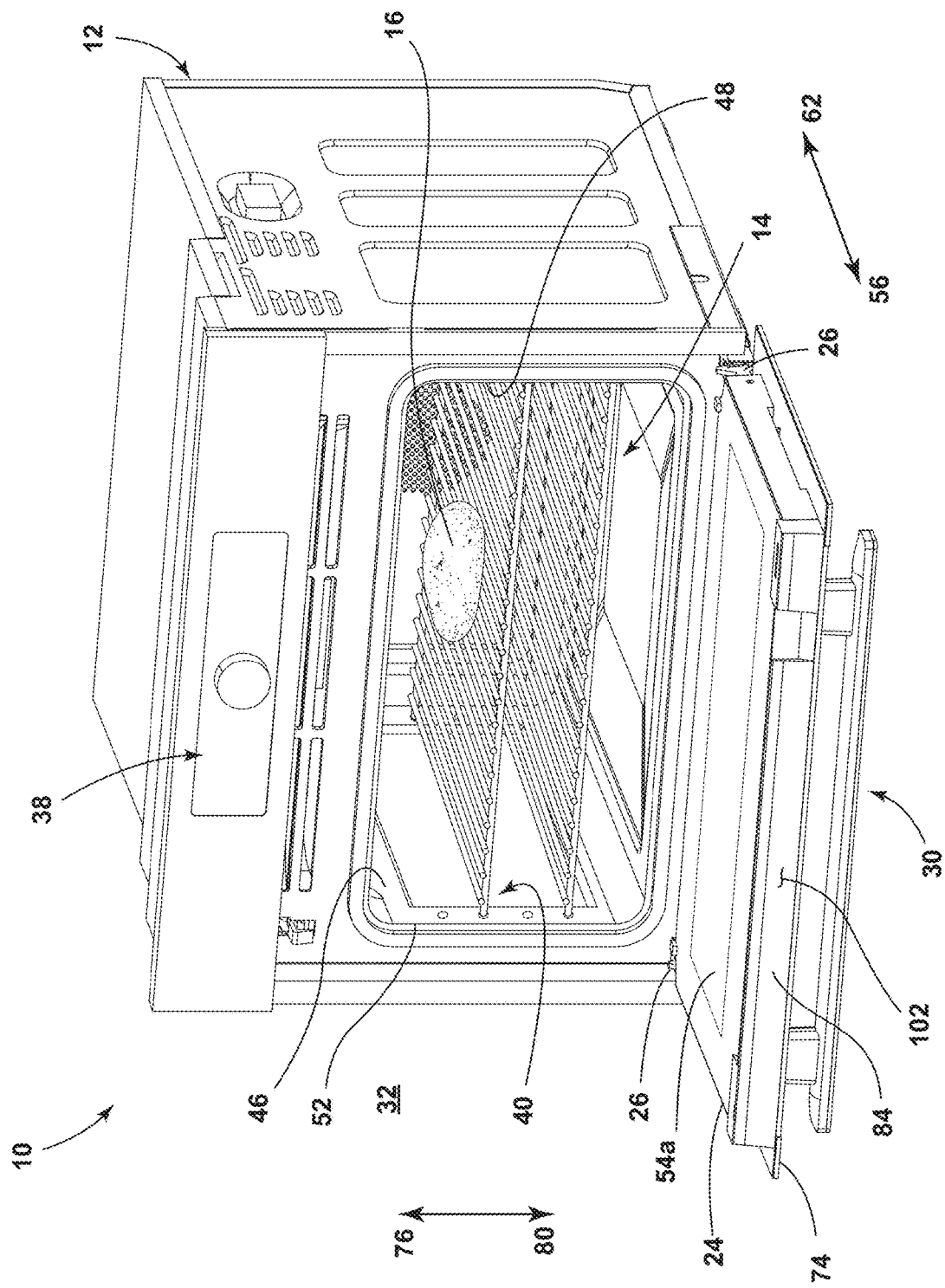
FIG. 2 is a front perspective view of the cooking oven of FIG. 1, illustrating the door in an open position revealing a deflector for air flowing within the door.
Figure 3:
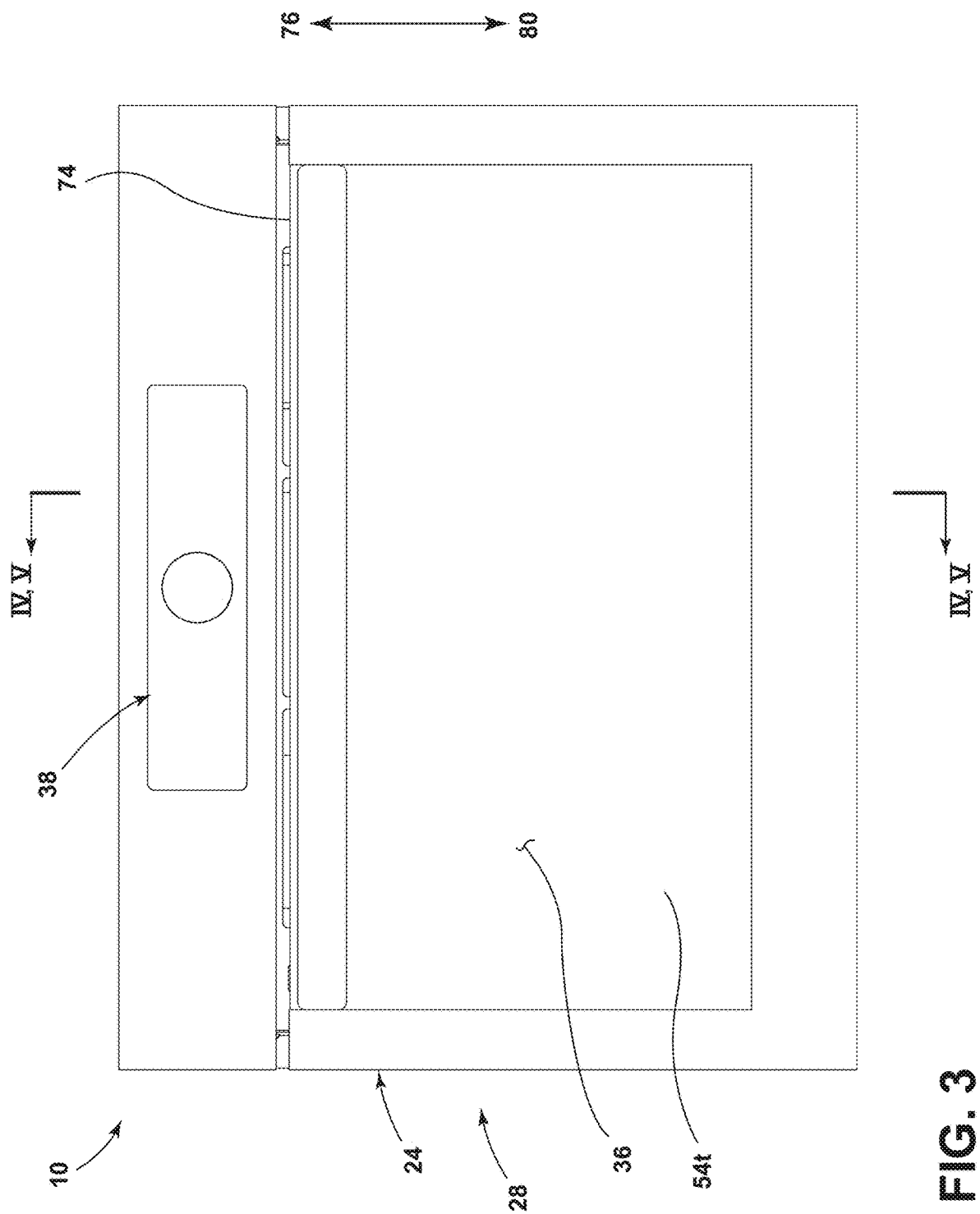
FIG. 3 is a front elevational view of the cooking oven of FIG. 1, illustrating the door in the closed position and revealing that a terminal glass panel of the door provides at least part of a forward surface of the door facing the external environment.
Figure 4:
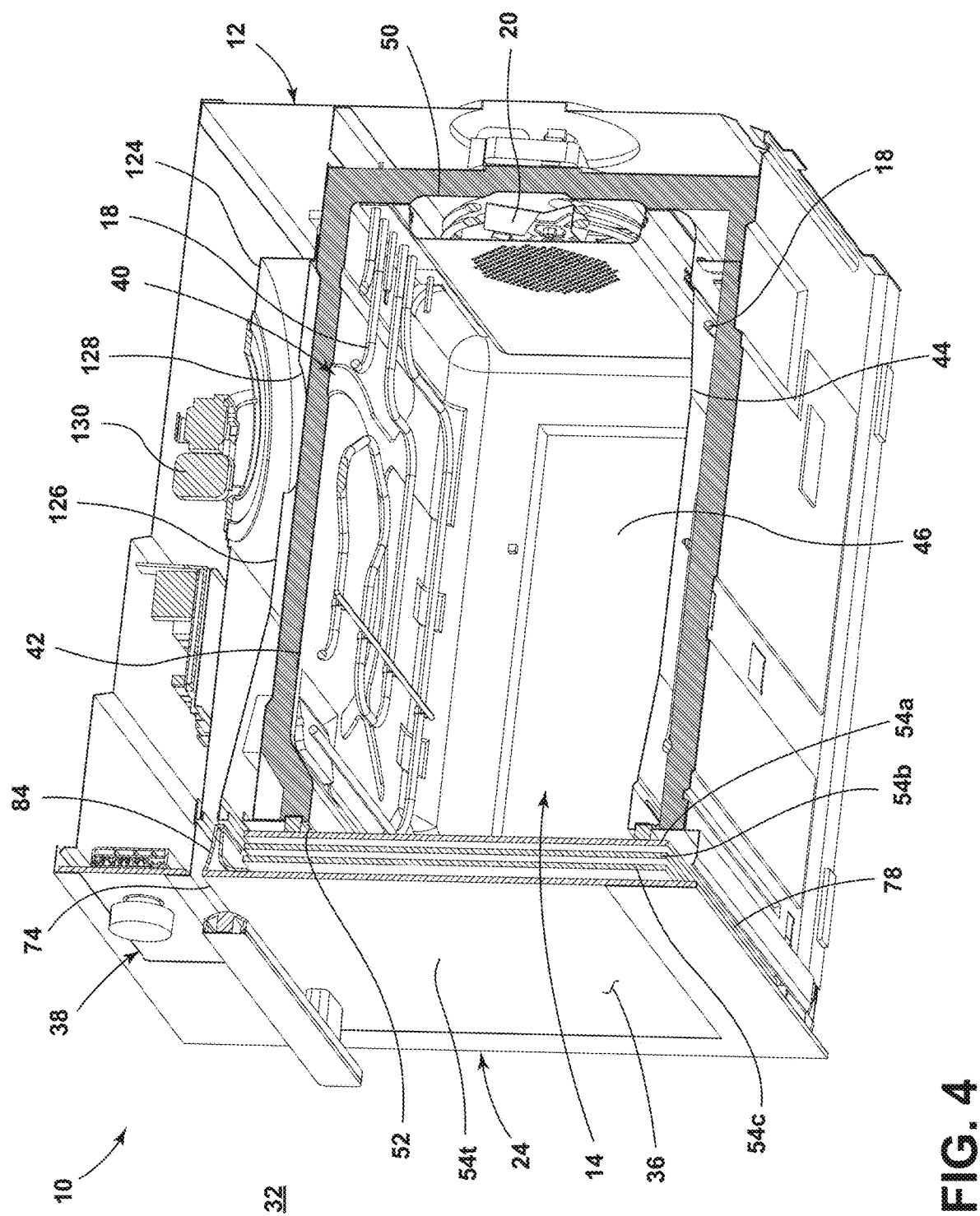
FIG. 4 is a perspective view of a cross-section of the cooking oven of FIG. 1 taken through line IV-IV of FIG. 3, illustrating the door including multiple glass panels that include the terminal glass panel and that are layered with a space between each adjacent glass panel.

The cooking oven 10 further includes a door 24. The door 24 is coupled to the cabinet 12, such as via the incorporation of hinges 26. The door 24 is movable to, from, and between a closed position 28 (see, e.g., FIG. 1) and an open position 30 (FIG. 2). In the closed position 28, the door 24 denies access to the cooking cavity 14 from an external environment 32. The external environment 32 may be provided by a kitchen 34, as illustrated in FIG. 1, but could be any environment that is external to the cooking oven 10. In the open position 30, the door 24 does not deny access to the cooking cavity 14. Rather, in the open position 30, the door 24 allows access to the cooking cavity 14 from the external environment 32. For example, a user of the cooking oven 10 can move the door 24 from the closed position 28 to the open position 30, deposit the food item 16 into the cooking cavity 14, and move the door 24 back to the closed position 28. The door 24 remains in the closed position 28 while the cooking oven 10 subjects the food item 16 to the cooking operation that the user desires. After the cooking operation has been completed, the user moves the door 24 to the open position 30, removes the food item 16, and returns the door 24 to the closed position 28. The door 24 has a forward surface 36 that faces the external environment 32 when the door 24 is in the closed position 28. The user can control the cooking operation that the cooking oven 10 performs at a human-machine interface 38 of the cooking oven 10.

As mentioned, the cabinet 12 defines the cooking cavity 14. In particular, as in the illustrated embodiments, the cabinet 12 can include an inner liner assembly 40. The inner liner assembly 40 includes a top wall 42, a bottom wall 44, side walls 46, 48, and a rear wall 50. The bottom wall 44 opposes the top wall 42. The side wall 46 opposes the side wall 48. The rear wall 50 opposes the door 24, when the door 24 is in the closed position 28. The inner liner assembly 40 provides an opening 52 into the cooking cavity 14 opposite the rear wall 50. The top wall 42, the bottom wall 44, the side walls 46, 48, and the rear wall 50 collectively define the cooking cavity 14. The door 24 covers the opening 52, when the door 24 is in the closed position 28. The door 24 reveals the opening 52 upon moving to the open position 30.

Figure 5:
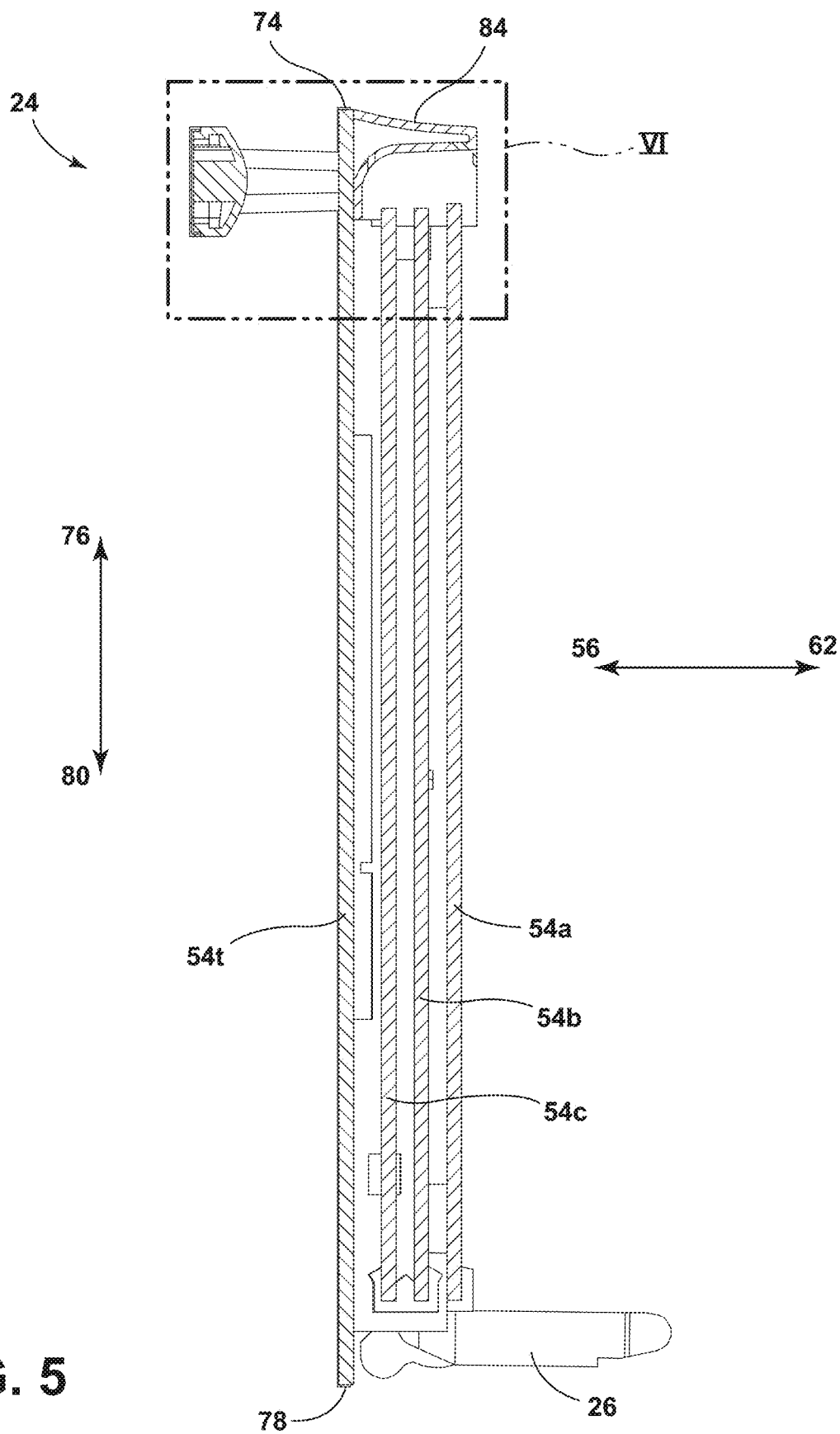
FIG. 5 is an elevational view of a cross-section of the door of the cooking oven of FIG. 1 taken through line V-V of FIG. 3, illustrating the deflector of the door disposed above the spaces between the multiple glass panels to divert air that had flowed upward through the spaces between the multiple glass panels rearward.
Figure 6:
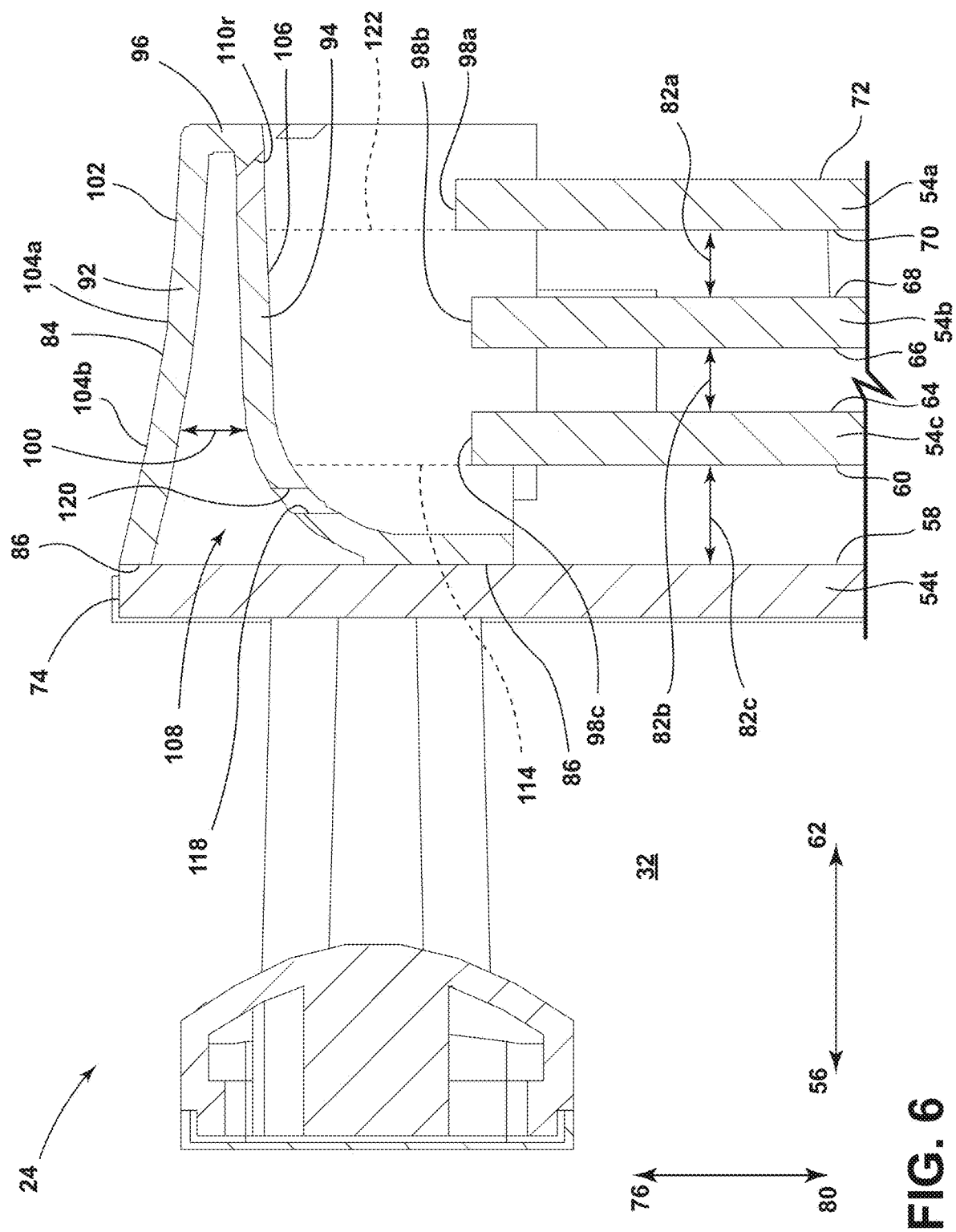
FIG. 6 is a magnified view of area VI of FIG. 5, illustrating the deflector including a top wall with a top surface that has breaks in slope to make the top surface concavely faceted, a bottom wall separated from the top wall, and a rear wall, together forming a chamber further bound by a rear primary surface of the terminal glass panel, and apertures through the bottom wall in communication with the chamber.
Figure 7:
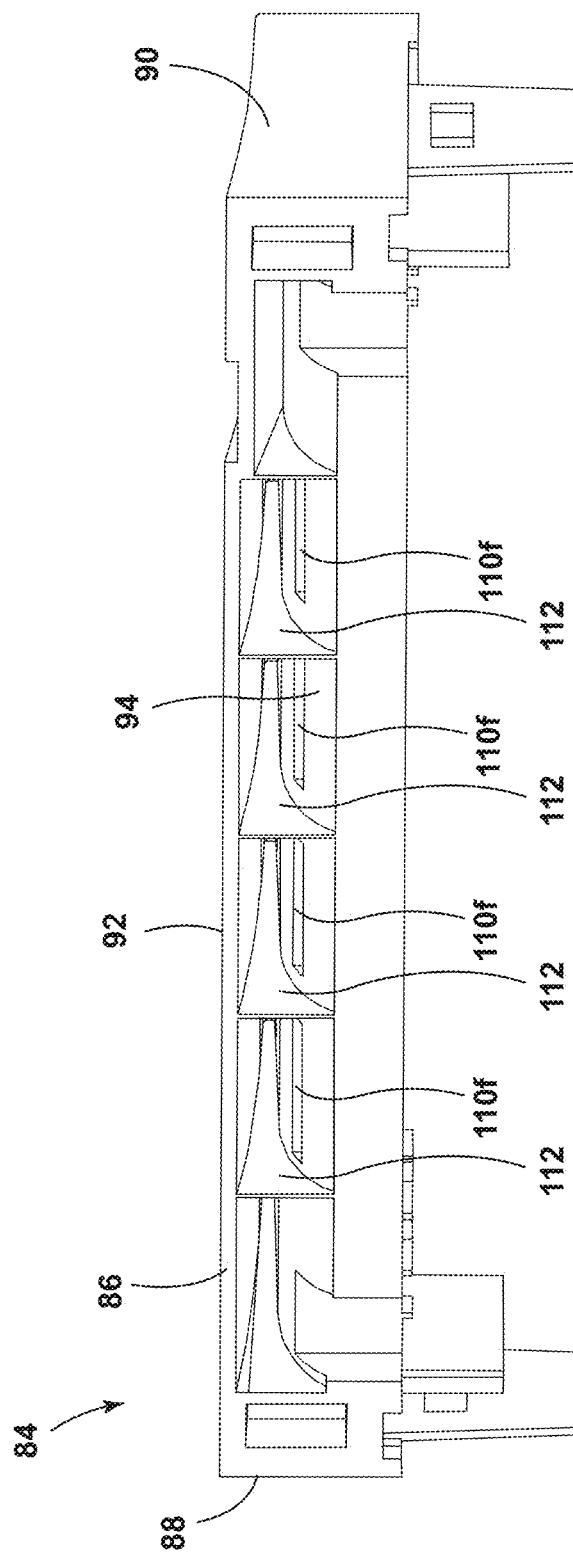
FIG. 7 is a front perspective of the deflector, illustrating the apertures through the bottom wall.
Figure 8:
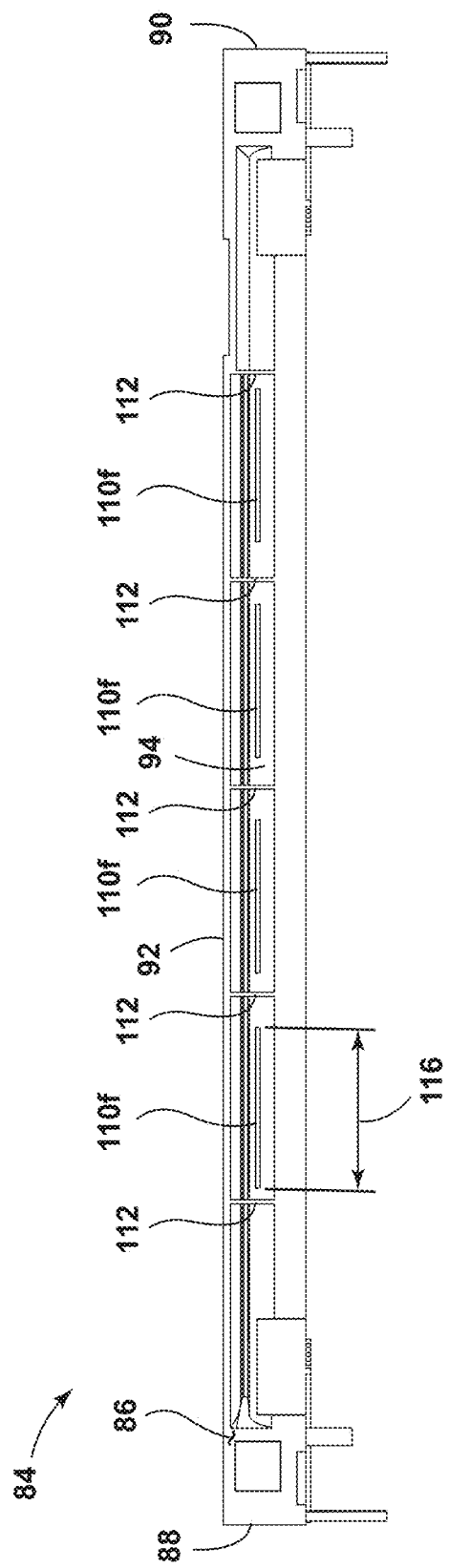
FIG. 8 is a front elevational view of the deflector, illustrating a forward surface that couples to the rear primary surface of the terminal glass panel, dividers segmenting the chamber when coupled to the terminal glass panel, and the apertures having a lateral orientation.
Figure 9:
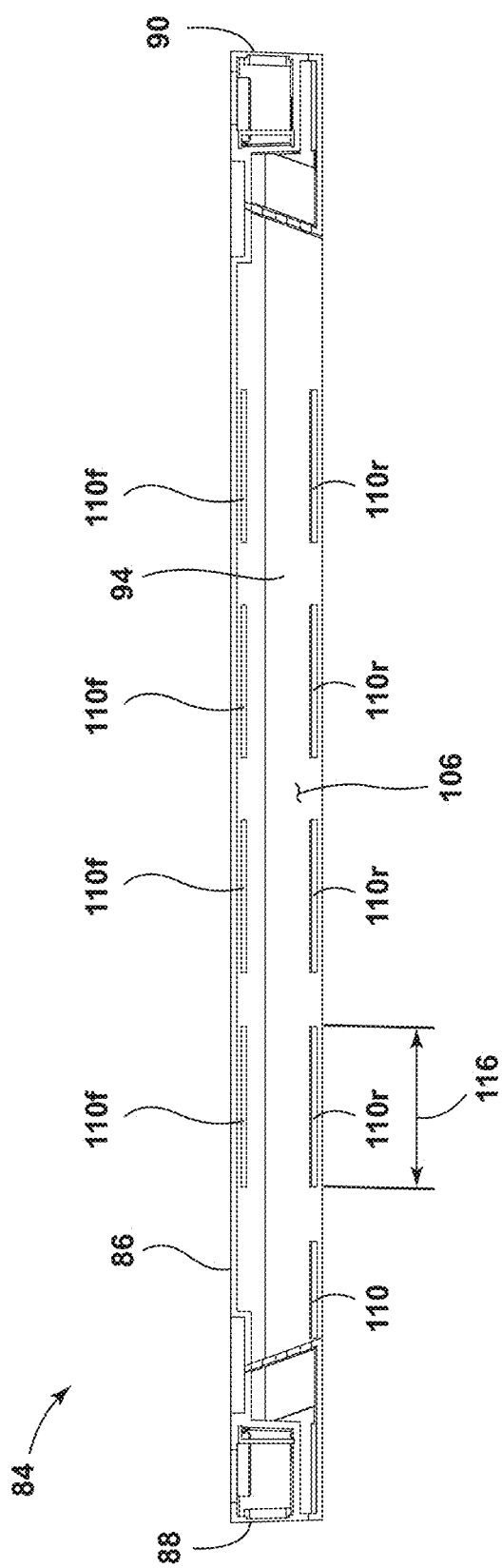
FIG. 9 is a bottom view of the deflector, illustrating the apertures through the bottom wall, and some of the apertures being pairs of apertures, with one aperture of the pair of apertures being disposed forward of the other aperture of the pair of apertures.
Figure 10:
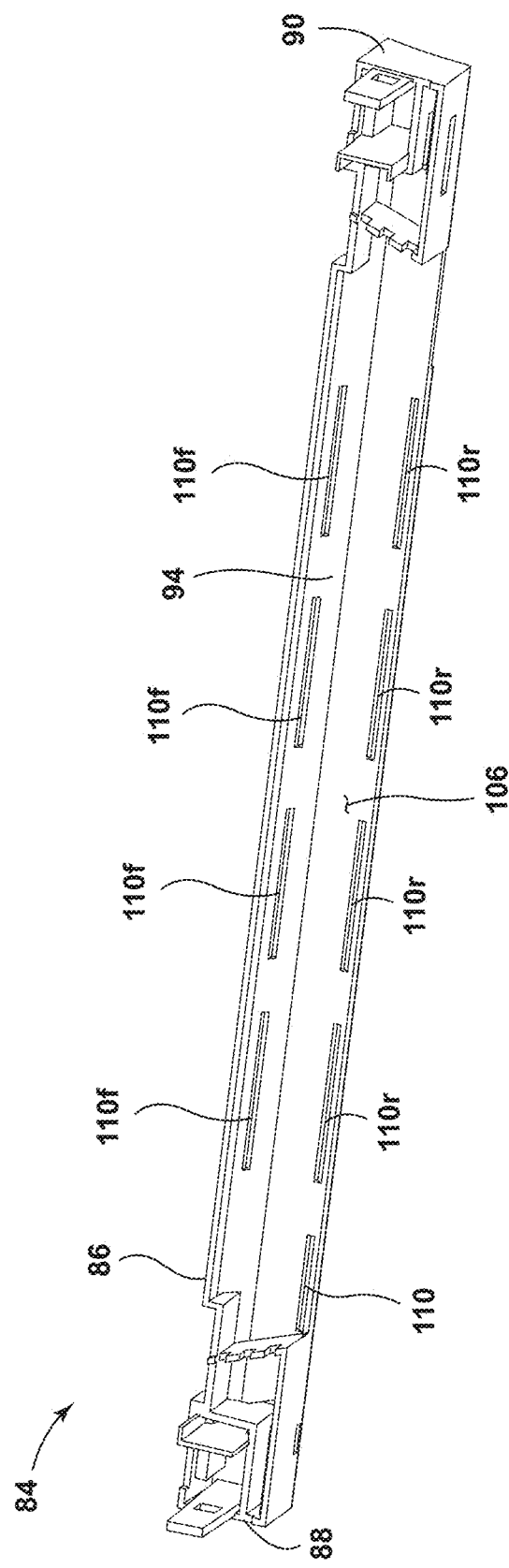
FIG. 10 is a bottom perspective view of the deflector, illustrating the apertures through the bottom wall.

Referring additionally to FIGS. 5 and 6, the door 24 includes multiple glass panels 54a, 54b, 54c, . . . 54n, 54t. For example, the illustrated embodiments include a glass panel 54a, a glass panel 54b disposed forward 56 of the glass panel 54a, a glass panel 54c disposed forward 56 of the glass panel 54b, and a terminal glass panel 54t forward 56 of the glass panel 54c. Of the multiple glass panels 54a, 54b, 54c, ... 54n, 54t, the terminal glass panel 54t is disposed closest to the external environment 32. When the door 24 is in the closed position 28 of the multiple glass panels 54a, 54b, 54c, ... 54n, 54t, the terminal glass panel 54t is disposed furthest from the cooking cavity 14 and provides at least part of the forward surface 36 of the door 24.

The multiple glass panels 54a, 54b, 54c, ... 54n, 54t are in a layered orientation. For example, a rear primary surface 58 of the terminal glass panel 54t opposes a forward primary surface 60 of the glass panel 54c directly rearward 62 of the terminal glass panel 54t. Further, a rear primary surface 64 of the glass panel 54c opposes a forward primary surface 66 of the glass panel 54b directly rearward 62 of the glass panel 54c. Likewise, a rear primary surface 68 of the glass panel 54b opposes a forward primary surface 70 of the glass panel 54a. The glass panel 54a has a rear primary surface 72 that faces the cooking cavity 14 when the door 24 is in the closed position 28. When the door 24 is in the closed position 28, the multiple glass panels 54a, 54b, 54c, ... 54n, 54t are disposed vertically. For example, a top edge 74 of the terminal glass panel 54t faces upward 76 and a bottom edge 78 of the terminal glass panel 54t faces downward 80, when the door 24 is in the closed position 28. The multiple glass panels 54a, 54b, 54c, ... 54n, 54t may number 2, 3, 4, 5, or 6, or any number more than 1.

Each adjacent glass panel of the multiple glass panels 54a, 54b, 54c, ... 54n, 54t is separated by a space 82a, 82b, 82c, ... 82n. For example, in the illustrated embodiments, a space 82c separates the terminal glass panel 54t from the glass panel 54c disposed rearward 62 of the terminal glass panel 54t. Similarly, a space 82b separates the glass panel 54c from the glass panel 54b, and a space 82a separates the glass panel 54b from the glass panel 54a. During use of the cooking oven 10, air flows upward 76 through the spaces 82a, 82b, 82c, ... 82n, which withdraws heat from the multiple glass panels 54a, 54b, 54c, ... 54n, 54t.

Referring additionally to FIGS. 7-10, the cooking oven 10 further includes a deflector 84. The deflector 84 is coupled to the terminal glass panel 54t. For example, in the illustrated embodiments, the deflector 84 includes a forward surface 86 to which the rear primary surface 58 of the terminal glass panel 54t is adhered. The deflector 84 can be coupled to the terminal glass panel 54t in other ways, such as with fasteners, brackets, and so on. The deflector 84 is disposed above the spaces 82a, 82b, 82c, ... 82n between the multiple glass panels 54a, 54b, 54c, ... 54n, 54t, when the door 24 is in the closed position 28. The deflector 84 extends laterally from a side 88 to a side 90. As will be further discussed below, the deflector 84 manipulates air flow within and above the door 24 during use of the cooking oven 10.

The deflector 84 includes a top wall 92, a bottom wall 94, and, in embodiments, a rear wall 96. The bottom wall 94 opposes the top wall 92. The top wall 92 and the bottom wall 94 provide the forward surface 86 that contacts the rear primary surface 58 of the terminal glass panel 54t. The bottom wall 94 opposes top edges 98a, 98b, 98c, ... 98n of the multiple glass panels 54a, 54b, 54c, ... 54n rearward 62 of the terminal glass panel 54t. The bottom wall 94 is separated from the top edges 98a, 98b, 98c, ... 98n of the multiple glass panels 54a, 54b, 54c, ... 54n to permit air flow between the bottom wall 94 and the top edges 98a, 98b, 98c, ... 98n.

Both the top wall 92 and the bottom wall 94 extend forward 56 from the rear wall 96. The top wall 92 is separated from the bottom wall 94 by a vertical distance 100. In embodiments, the vertical distance 100 separating the bottom wall 94 and the top wall 92 of the deflector 84 decreases as the deflector 84 extends rearward 62 from the terminal glass panel 54t.

In embodiments, the top wall 92 of the deflector 84 terminates flush with the top edge 74 of the terminal glass panel 54t. The top wall 92 of the deflector 84 transitioning to the top edge 74 of the terminal glass panel 54t without the top wall 92 and the top edge 74 being elevationally offset allows air to flow in the forward 56 direction over the top wall 92 of the deflector 84 and then smoothly over the top edge 74 of the terminal glass panel 54t without the generation of turbulence. Turbulent air flow would reduce the volume of air flowing through the spaces 82a, 82b, 82c, ... 82n and therefore slow heat transfer from the terminal glass panel 54t out to the external environment 32.

The top wall 92 of the deflector 84 has a top surface 102. The top surface 102 faces generally upward 76 when the door 24 is in the closed position 28. In embodiments, the top surface 102 is arcuate. In other embodiments, the top surface 102 has breaks 104a, 104b in slope in the forward 56 direction from the rear wall 96. For example, in the illustrated embodiments, the top surface 102 has a slope from the rear wall 96 to the break 104a, where the top surface 102 has a slightly steeper slope until the break 104b, where the top surface 102 again has a slightly steeper slope until the top wall 92 terminates to contact the top edge 74 of the terminal glass panel 54t.

Similarly, the bottom wall 94 of the deflector 84 has a bottom surface 106. The bottom surface 106 faces generally downward 80 when the door 24 is in the closed position 28. In embodiments, the bottom surface 106 is arcuate, such as concavely arcuate as in the illustrated embodiments. In other embodiments, the bottom surface 106 has breaks in slope in the forward 56 direction from the rear wall 96. The top surface 102 and the bottom surface 106 of the deflector 84 being arcuate or having breaks in slope, with the slopes becoming steeper closer to the terminal glass panel 54t (e.g., collectively concave), improves air flow over the deflector 84. Improved air flow improves transfer of heat from the multiple glass panels 54a, 54b, 54c, ... 54n, 54t to the air, which is expelled into the external environment 32. The deflector 84 can be made of metal, plastic, or some other suitable material.

The top wall 92, the bottom wall 94, and if present the rear wall 96 of the deflector 84, together with the rear primary surface 58 of the terminal glass panel 54t define a chamber 108. The deflector 84 further includes apertures 110 into the chamber 108. The apertures 110 permit air flow into and out of the chamber 108 to withdraw heat from the terminal glass panel 54t near the top edge 74 of the terminal glass panel 54t.

In embodiments, at least a portion of the apertures 110 into the chamber 108 of the deflector 84 are through the bottom wall 94 of the deflector 84. During use of the cooking oven 10, air flows upward 76 within the spaces 82a, 82b, 82c, ... 82n between the multiple glass panels 54a, 54b, 54c, ... 54n, 54t. Placing the apertures 110 through the bottom wall 94 of the deflector 84 permits the air within the spaces 82a, 82b, 82c, ... 82n to flow relatively easily through the apertures 110 and into the chamber 108.

In embodiments, at least a portion of the apertures 110 into the chamber 108 of the deflector 84 are pairs of apertures 110f, 110r through the bottom wall 94, with one aperture 110f disposed forward 56 of the other aperture 110r. Due to the bottom surface 106 of the deflector 84, the deflector 84 deflects some of the air exiting the spaces 82a, 82b, 82c, ... 82n to flow rearward 62 beyond the rear wall 96 of the deflector 84. However, some of the air exiting the spaces 82a, 82b, 82c, ... 82n flows through the aperture 110f that is disposed forward 56 into the chamber 108 and out of the chamber 108 through the aperture 110r that is disposed rearward 62 to rejoin the air flowing rearward 62 beyond the rear wall 96 of the deflector 84. The deflector 84 can include dividers 112 within the chamber 108 to segment the pairs of apertures 110f, 110r and provide additional structural stability to the deflector 84.

In embodiments, at least a portion of the apertures 110 into the chamber 108 are disposed through the bottom wall 94 of the deflector 84 between the rear primary surface 58 of the terminal glass panel 54t and a plane 114 that the forward primary surface 60 of the glass panel 54c immediately rearward 62 of the terminal glass panel 54t forms. Air flows upward 76 within the space 82c between the terminal glass panel 54t and the glass panel 54c immediately rearward 62 of the terminal glass panel 54t. Positioning some of the apertures 110 elevationally above the space 82c between the terminal glass panel 54t and the glass panel 54c immediately rearward 62 of the terminal glass panel 54t facilitates flow of the air from the space 82c into the chamber 108 of the deflector 84. The greater the volume of air that enters the chamber 108, the greater the air lowers the temperature of the terminal glass panel 54t forward 56 of the deflector 84.

In embodiments, the apertures 110 (including any pairings of apertures 110f, 110r) into the chamber 108 of the deflector 84 are laterally oriented. That means that each of the apertures 110 has a largest dimension 116 that is parallel to a line connecting the two sides 88, 90 of the deflector 84. The largest dimension 116 of the apertures 110 of the deflector 84 is thus generally orthogonal to the flow of air along the bottom surface 106 of the bottom wall 94 of the deflector 84, which increases the volume of air flow into and out of the chamber 108 of the deflector 84. The increased air flow into and out of the chamber 108 increases heat transfer from the terminal glass panel 54t forward 56 of the deflector 84 to the air and, thus, lowers the temperature of the terminal glass panel 54t forward 56 of the deflector 84.

In embodiments, at least a portion of the apertures 110 (e.g., the apertures 110f) into the chamber 108 of the deflector 84 are disposed vertically through the bottom wall 94 of the deflector 84, when the door 24 is in the closed position 28. An example is illustrated at FIG. 6, where the aperture 110f that is forwardly disposed has a forward surface 118 and a rear surface 120 that are both vertical. The air flowing in the space 82c between the terminal glass panel 54t flows upward 76. The vertical orientation of the aperture 110f generally directly above the space 82c permits the air to flow with less resistance into the chamber 108. The less resistance, the greater the volume of air that flows into the chamber 108 to lower the temperature of the terminal glass panel 54t forward 56 of the deflector 84.

In embodiments, at least a portion of the apertures 110 (e.g., apertures 110r) into the chamber 108 of the deflector 84 are slanted through the bottom wall 94 rearward 62 out of the chamber 108. The apertures 110r disposed slanted through the bottom wall 94 are not orthogonal to the bottom surface 106 of the bottom wall 94. As the air flows upward 76 within the space 82c adjacent to the terminal glass panel 54t, the air enters the chamber 108 of the deflector 84 through the aperture 110f that is forwardly disposed. The incoming air pushes air within the chamber 108 out through the aperture 110r that is slanted. Simultaneously, the bottom wall 94 of the deflector 84 directs air that did not enter the chamber 108 rearward 62. The air exiting the chamber 108 through the aperture 110r that is slanted then rejoins the rearward 62 flowing air. The aperture 110r being slanted helps prevent air from flowing upward 76 into the chamber 108 through the aperture 110r, such as from the space 82a, which would counter the forward 56-to-rearward 62 direction of air flow within the chamber 108.

In embodiments, at least a portion of the apertures 110 (e.g., apertures 110r) into the chamber 108 of the deflector 84 are disposed through the bottom wall 94 of the deflector 84 rearward 62 of a plane 122 that the forward primary surface 70 of the glass panel 54a that is most rearwardly disposed forms. Air exiting the chamber 108 through the apertures 110r that are disposed rearward of the plane 122 does not flow counter to air flowing upward 76 through the spaces 82a, 82b, 82c, ... 82n between the multiple glass panels 54a, 54b, 54c, ... 54n. Countering the air flowing upward 76 through the spaces 82a, 82b, 82c, ... 82n would reduce air flow both out of the chamber 108 and upward 76 through the spaces 82a, 82b, 82c, ... 82n, which would reduce heat transfer from the terminal glass panel 54t to the air. Positioning at least a portion of the apertures 110 (e.g., apertures 110r) so that the air exits the chamber 108 of the deflector 84 rearward 62 of the space 82a that is most rearward 62 from the terminal glass panel 54t prevents such suboptimal air flow from occurring.

In embodiments, the cooking oven 10 is configured to perform a pyrolytic self-cleaning operation. For example, the one or more heating elements 18 of the cooking oven 10 can heat the cooking cavity 14 to a temperature sufficient for pyrolytic self-cleaning. The user can command the cooking oven 10 to perform the pyrolytic self-cleaning operation at the human-machine interface 38.

During use of the cooking oven 10, such as during the pyrolytic self-cleaning operation, air flows from the external environment 32, under a bottom edge 78 of the terminal glass panel 54t of the door 24, into the spaces 82a, 82b, 82c, ... 82n between the multiple glass panels 54a, 54b, 54c, ... , 54n, 54t, and upward 76 through the spaces 82a, 82b, 82c, ... 82n. The deflector 84 deflects the air exiting the spaces 82a, 82b, 82c, ... 82n after flowing upward 76 within the spaces 82a, 82b, 82c, ... 82n. Some of the air first flows into the chamber 108 of the deflector 84, such as through the apertures 110f forwardly disposed into the chamber 108, and then out of the chamber 108, such as out of the apertures 110r rearwardly disposed. The bottom wall 94 of the deflector 84 deflects the air that did not enter the chamber 108 of the deflector 84 and the air that has exited the chamber 108 rearward 62 into a duct system 124. The air initially flows within the duct system 124 rearward 62 beneath a separator panel 126 of the duct system, upward 76 through an aperture 128 through the separator panel 126, forward 56 above the separator panel 126, then over the top wall 92 of the deflector 84, and then out to the external environment 32 between the top edge 74 of the terminal glass panel 54t and the human-machine interface 38. The cooking oven 10 further includes a fan 130 to cause the air to flow in the described path.

In embodiments, the forward surface 36 of the door 24 directly forward 56 of the chamber 108 of the deflector 84, when the door 24 is in the closed position 28, exhibits a temperature that is less than 60° C. during an entirety of a pyrolytic self-cleaning operation of the cooking oven 10. In embodiments, the temperature that the forward surface 36 exhibits is less than 59° C., less than 58° C., less than 57° C., less than 56° C., less than 55° C., less than 54° C., or even less than 53° C. during an entirety of a pyrolytic self-cleaning operation of the cooking oven 10.

EXAMPLES

Example 1 and Comparative Example 1

Figure 11:
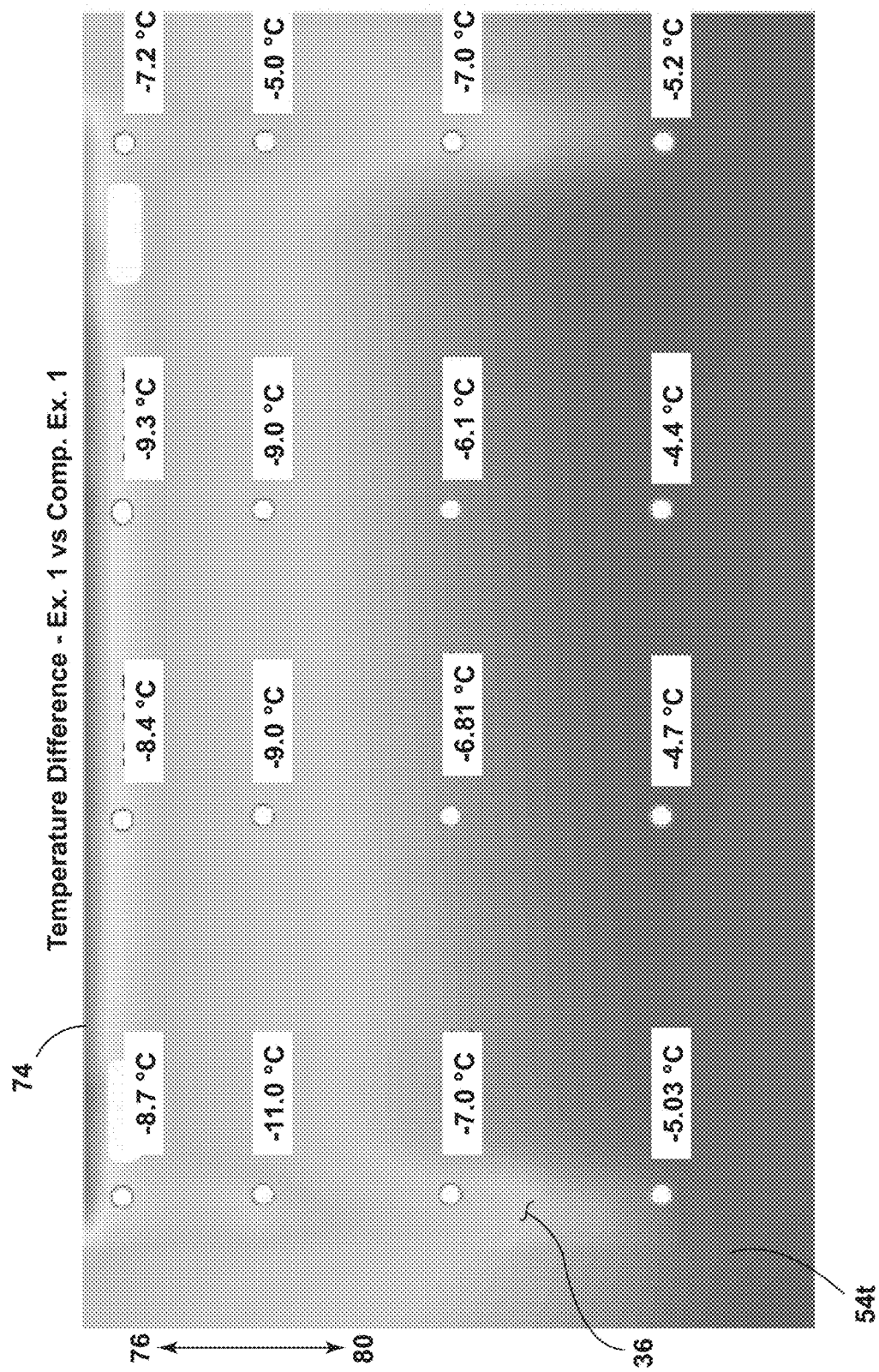
FIG. 11, pertaining to the Examples, is a graph plotting computer modeled temperature difference as a function of position on the forward surface of the door that the door with the deflector of the present disclosure exhibits compared to a door with a similar deflector but without a chamber and with the top surface of the deflector offset from the top edge of the terminal glass panel.

For Example 1, a computer model was performed to determine the temperature of the door at various points on the forward surface facing the external environment with the deflector of the present disclosure incorporated into the door during a pyrolytic self-cleaning operation. For Comparative Example 1, the same computer model as Example 1 was performed with a deflector like the deflector of the present disclosure but (i) without the apertures through the bottom wall of the deflector into the chamber 108 of the deflector and (ii) with the top wall of the deflector offset lower from (e.g., not flush with) the top edge of the terminal glass panel. The difference in temperature at the various points on the forward surface of the door between Example 1 and Comparative Example 1 is plotted on the graph reproduced at FIG. 11. The graph reveals the deflector of the present disclosure as modeled with Example 1 provides much lower temperatures at the forward surface of the door—not only near the top edge of the terminal glass panel (providing the forward surface of the door) but all the way down the terminal glass panel to the bottom edge. The apertures into the chamber 108 and disposing the top wall of the deflector flush with the top edge of the terminal glass panel improve heat transfer from the terminal glass panel to the air—not only in the vicinity of the deflector but throughout the entire terminal glass panel.

Figure 12A:
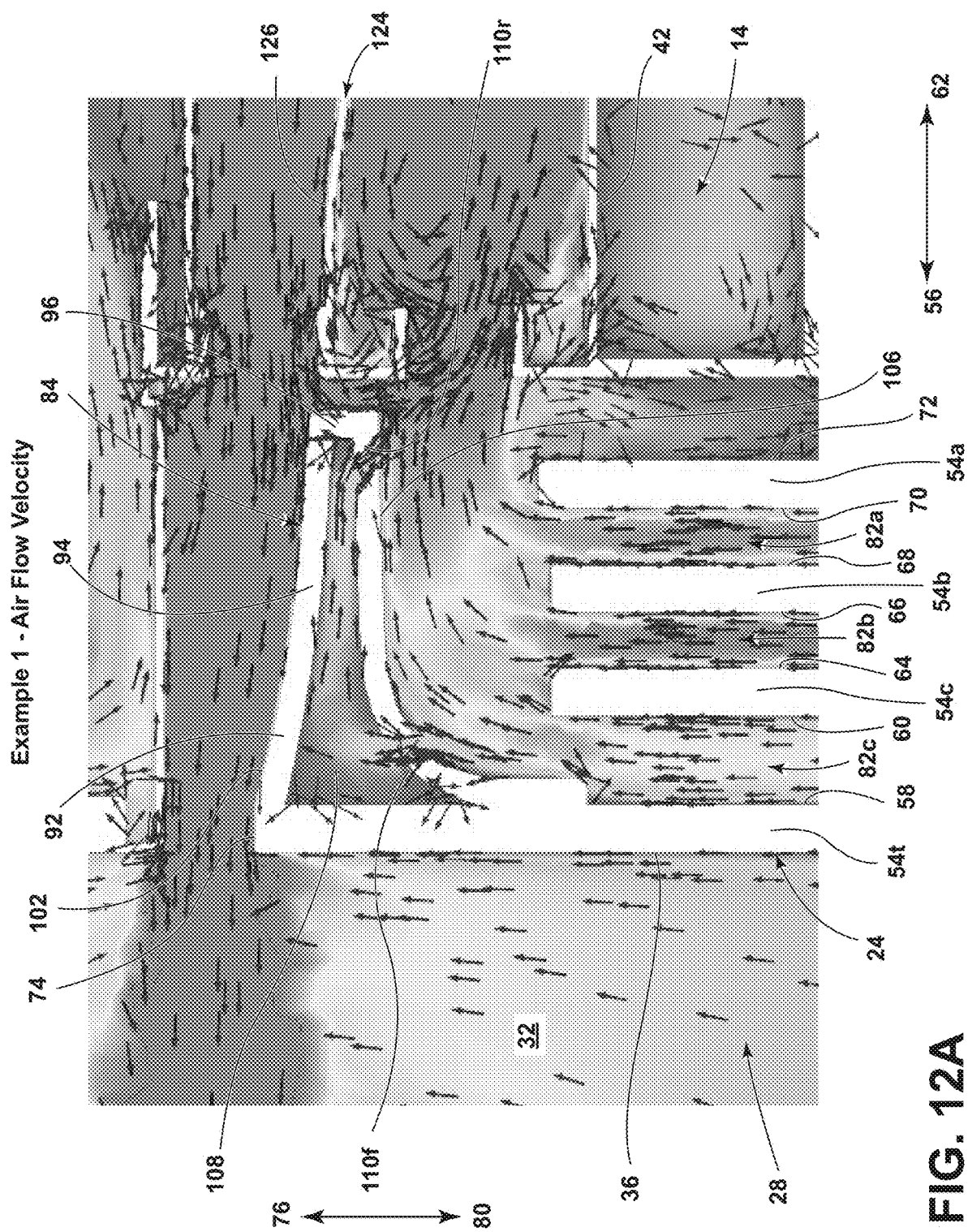
FIG. 12A, pertaining to Example 1, is a graph that plots computer modeled air flow velocity as a function of position within the door around the deflector of the present disclosure, illustrating (i) smooth air flow over the top surface of the deflector engaging flush with the top edge of the terminal glass panel and (ii) air flowing upward in the spaces between the multiple glass panels before the deflector deflects the air flow rearward into a duct system, with a portion first flowing through the chamber.
Figure 12B:
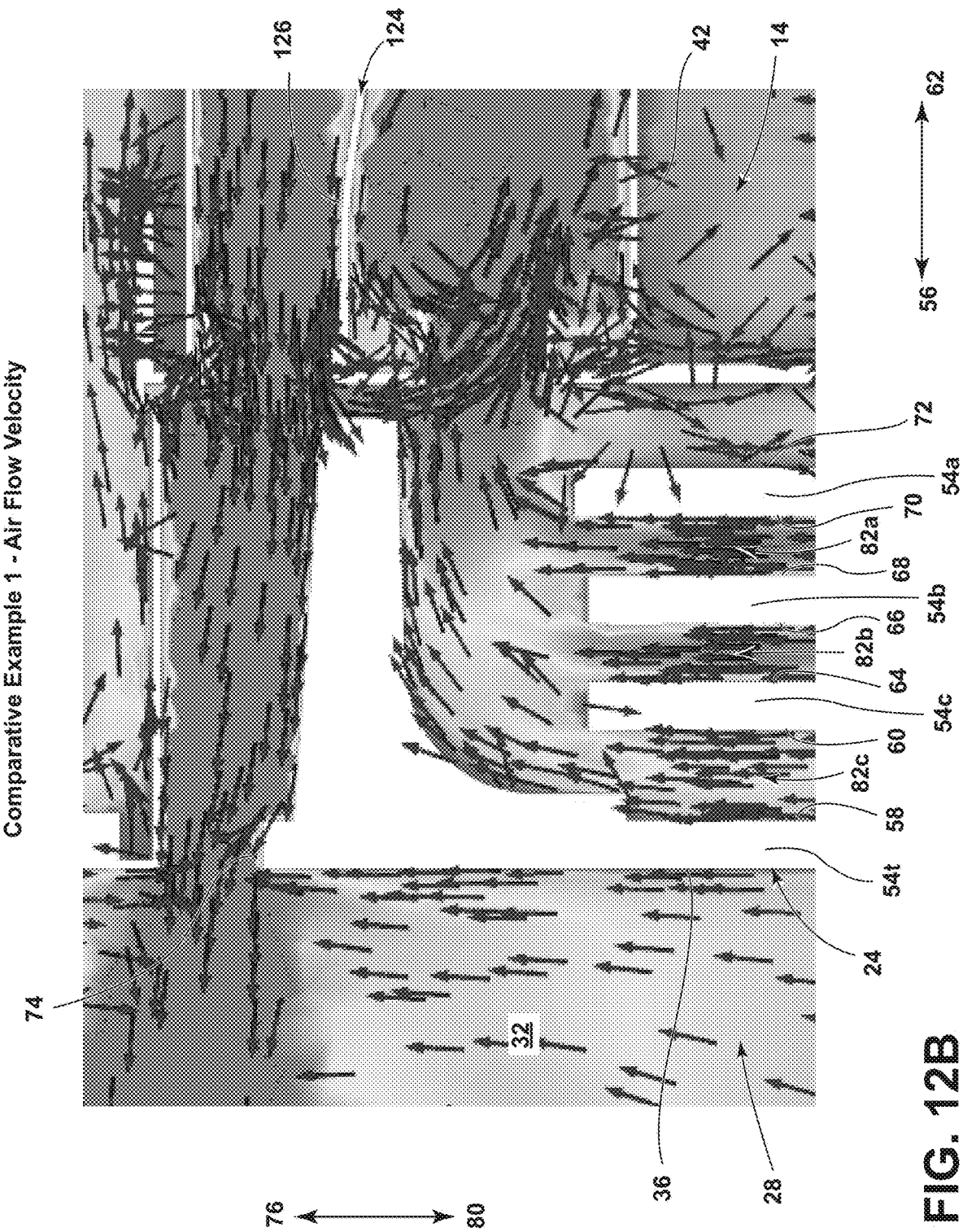
FIG. 12B, pertaining to Comparative Example 1, is the same graph as FIG. 12A but with the deflector (i) not having a chamber, (ii) having a top surface offset from the top edge of the terminal glass panel, and (iii) having a planar top surface, all in contrast to the deflector of the present disclosure, illustrating turbulent air flow over the top edge of the terminal glass panel and at the junction of the deflector and the duct system.

In addition, the computer model calculated air flow velocities as a function of position within the cooking oven for both Example 1 and Comparative Example 1. The air flow velocities at a cross-section of the cooking oven in the vicinity of the deflector for each are reproduced at FIGS. 12A (for Example 1) and 12B (for Comparative Example 1). The graphs illustrate that the deflector of Example 1 with the top surface of the top wall being concave and mating flush with the top edge of terminal glass panel generates more uniform air flow from above the deflector out to the external environment than the offset deflector of Comparative Example 1. Further, the graphs illustrate that the apertures through the bottom wall of the deflector allow air to flow within the chamber 108, which withdraws heat from the terminal glass panel.

The invention disclosed herein is further summarized in the following paragraphs and is further characterized by combinations of any and all of the various aspects described therein. According to a first aspect of the present disclosure, a cooking oven comprises (A) a cabinet defining a cooking cavity; (B) a door coupled to the cabinet, the door movable to, from, and between (1) a closed position that denies access to the cooking cavity from an external environment and (2) an open position that allows access to the cooking cavity from the external environment, the door comprising: (a) multiple glass panels disposed in a layered orientation and with each adjacent glass panel separated by a space, the multiple glass panels comprising a terminal glass panel that is disposed closest to the external environment and furthest from the cooking cavity when the door is in the closed position, and (b) a deflector coupled to the terminal glass panel, the deflector disposed above the spaces between the multiple glass panels when the door is in the closed position to deflect air exiting the space after flowing upward within the spaces, the deflector comprising (i) a top wall, (ii) a bottom wall opposing the top wall and separated from the top wall by a vertical distance, the bottom wall additionally opposing top edges of the multiple glass panels disposed rearward of the terminal glass panel, (iii) a chamber defined at least in part by the top wall, the bottom wall, and the terminal glass panel, and (iv) apertures into the chamber.

According to a second aspect of the present disclosure, the cooking oven of the first aspect is presented, wherein the vertical distance separating the bottom wall and the top wall of the deflector decreases as the deflector extends rearward from the terminal glass panel.

According to a third aspect of the present disclosure, the cooking oven of any one of the first through second aspects is presented, wherein (i) the terminal glass panel comprises a top edge, and (ii) the top wall of the deflector terminates flush with the top edge of the terminal glass panel.

According to a fourth aspect of the present disclosure, the cooking oven of any one of the first through third aspects is presented, wherein the top wall of the deflector comprises a top surface that is arcuate or has breaks in slope that are collectively concave.

According to a fifth aspect of the present disclosure, the cooking oven of any one of the first through fourth aspects is presented, wherein the bottom wall of the deflector comprises a bottom surface that is arcuate or has breaks in slope that are collectively concave.

According to a sixth aspect of the present disclosure, the cooking oven of any one of the first through fifth aspects is presented, wherein at least a portion of the apertures into the chamber of the deflector are through the bottom wall of the deflector.

According to a seventh aspect of the present disclosure, the cooking oven of any one of the first through sixth aspects is presented, wherein at least a portion of the apertures into the chamber of the deflector are pairs of apertures through the bottom wall of the deflector, with one aperture of each of the pairs of apertures disposed forward of the other aperture.

According to an eighth aspect of the present disclosure, the cooking oven of any one of the first through seventh aspects is presented, wherein the apertures into the chamber of the deflector are laterally oriented.

According to a ninth aspect of the present disclosure, the cooking oven of any one of the first through eighth aspects is presented, wherein at least a portion of the apertures into the chamber are disposed through the bottom wall of the deflector between a rear primary surface of the terminal glass panel and a plane that a forward primary surface of the glass panel immediately rearward of the terminal glass panel forms.

According to a tenth aspect of the present disclosure, the cooking oven of any one of the first through ninth aspects is presented, wherein at least a portion of the apertures into the chamber of the deflector are disposed vertically through the bottom wall of the deflector, when the door is in the closed position.

According to an eleventh aspect of the present disclosure, the cooking oven of any one of the first through tenth aspects is presented, wherein at least a portion of the apertures into the chamber of the deflector are slanted through the bottom wall rearward out of the chamber.

According to a twelfth aspect of the present disclosure, the cooking oven of any one of the first through eleventh aspects are presented, wherein at least a portion of the apertures into the chamber of the deflector are disposed through the bottom wall of the deflector rearward of a plane that a forward surface of the glass panel that is most rearwardly disposed forms.

According to a thirteenth aspect of the present disclosure, the cooking oven of any one of the first through twelfth aspects is presented, wherein the cooking oven is configured to perform a pyrolytic self-cleaning operation.

According to a fourteenth aspect of the present disclosure, the cooking oven of any one of the first through thirteenth aspects is presented, wherein (i) the door further comprises a forward surface that faces the external environment when the door is in the closed position, and (ii) the forward surface of the door directly forward of the chamber of the deflector when the door is in the closed position exhibits a temperature that is less than 53° C. throughout an entirety of a pyrolytic self-cleaning operation of the cooking oven.

According to a fifteenth aspect of the present disclosure, a cooking oven comprises: (I) a cabinet defining a cooking cavity; and (II) a door coupled to the cabinet, the door movable to, from, and between (i) a closed position that denies access to the cooking cavity from an external environment and (ii) an open position that allows access to the cooking cavity from the external environment, and the door comprising: (A) multiple glass panels disposed in a layered orientation and with adjacent glass panels separated by a space, the multiple glass panels comprising a terminal glass panel that is disposed closest to the external environment and furthest from the cooking cavity when the door is in the closed position, and (B) a deflector coupled to the terminal glass panel, the deflector disposed above the spaces between the multiple glass panels when the door is in the closed position to deflect air exiting the space after flowing upwards within the spaces, the deflector comprising (i) a top wall that provides a top surface that is concavely arcuate or has breaks in slope that are collectively concave and (ii) a bottom wall opposing the top wall and separated from the top wall by a vertical distance, the bottom wall additionally opposing top edges of the multiple glass panels disposed rearward of the terminal glass panel.

According to a sixteenth aspect of the present disclosure, the cooking oven of the fifteenth aspect is presented, wherein the deflector further comprises (i) a chamber bound at least in part by the top wall, the bottom wall, and the terminal glass panel and (ii) apertures into the chamber.

According to a seventeenth aspect of the present disclosure, the cooking oven of the sixteenth aspect is presented, wherein at least a portion of the apertures into the chamber of the deflector are disposed through the bottom wall of the deflector.

According to an eighteenth aspect of the present disclosure, the cooking oven of any one of the sixteenth through seventeenth aspects is presented, wherein at least a portion of the apertures into the chamber of the deflector are pairs of apertures through the bottom wall of the deflector, with one aperture of each of the pairs of apertures disposed forward of the other aperture.

According to a nineteenth aspect of the present disclosure, the cooking oven of any one of the sixteenth through eighteenth aspects are presented, wherein at least a portion of the apertures into the chamber of the deflector are slanted through the bottom wall rearward out of the chamber.

According to a twentieth aspect of the present disclosure, the cooking oven of any one of the fifteenth through nineteenth aspects are presented, wherein (i) the terminal glass panel comprises a top edge, and (ii) the top wall of the deflector terminates flush with the top edge of the terminal glass panel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, and/or the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking oven comprising:
 a cabinet defining a cooking cavity;
 a door coupled to the cabinet, the door movable to, from, and between (i) a closed position that denies access to the cooking cavity from an external environment and (ii) an open position that allows access to the cooking cavity from the external environment, the door comprising:
  multiple glass panels disposed in a layered orientation and with each adjacent glass panel separated by a space, the multiple glass panels comprising a terminal glass panel that is disposed closest to the external environment and furthest from the cooking cavity when the door is in the closed position, the terminal glass panel comprising a rear primary surface; and
a deflector coupled to the terminal glass panel, the deflector disposed above the spaces between the multiple glass panels when the door is in the closed position to deflect air exiting the spaces after flowing upward within the spaces, the deflector comprising (i) a top wall, (ii) a bottom wall opposing the top wall and separated from the top wall by a vertical distance, the bottom wall additionally opposing top edges of the multiple glass panels that are rearward of the terminal glass panel, (iii) a chamber defined at least in part by the top wall, the bottom wall, and the terminal glass panel, and (iv) apertures into the chamber,
wherein the top wall and the bottom wall of the deflector both provide a forward surface that contacts the rear primary surface of the terminal glass panel such that both the top wall and the bottom wall of the deflector extend rearward from the rear primary surface of the terminal glass panel.

2. The cooking oven of claim 1, wherein
the vertical distance separating the bottom wall and the top wall of the deflector decreases as the deflector extends rearward from the terminal glass panel.

3. The cooking oven of claim 1, wherein
the top wall of the deflector terminates flush with the top edge of the terminal glass panel.

4. The cooking oven of claim 1, wherein
the top wall of the deflector comprises a top surface that is arcuate or has breaks in slope that are collectively concave.

5. The cooking oven of claim 1, wherein
the bottom wall of the deflector comprises a bottom surface that is arcuate or has breaks in slope that are collectively concave.

6. The cooking oven of claim 1, wherein
at least a portion of the apertures into the chamber of the deflector are through the bottom wall of the deflector.

7. The cooking oven of claim 1, wherein
at least a portion of the apertures into the chamber of the deflector are pairs of apertures through the bottom wall of the deflector, with one aperture of each of the pairs of apertures disposed forward of the other aperture.

8. The cooking oven of claim 1, wherein
the apertures into the chamber of the deflector are laterally oriented.

9. The cooking oven of claim 1, wherein
at least a portion of the apertures into the chamber are disposed through the bottom wall of the deflector between the rear primary surface of the terminal glass panel and a plane that a forward primary surface of the glass panel immediately rearward of the terminal glass panel forms.

10. The cooking oven of claim 1, wherein
at least a portion of the apertures into the chamber of the deflector are disposed vertically through the bottom wall of the deflector, when the door is in the closed position.

11. The cooking oven of claim 1, wherein
at least a portion of the apertures into the chamber of the deflector are slanted through the bottom wall rearward out of the chamber.

12. The cooking oven of claim 1, wherein
at least a portion of the apertures into the chamber of the deflector are disposed through the bottom wall of the deflector rearward of a plane that a forward surface of the glass panel of the multiple glass panels that is most rearwardly disposed forms.

13. The cooking oven of claim 1, wherein
the cooking oven is configured to perform a pyrolytic self-cleaning operation,
the door further comprises a forward surface that faces the external environment when the door is in the closed position, and
the forward surface of the door directly forward of the chamber of the deflector when the door is in the closed position exhibits a temperature that is less than 53° C. throughout an entirety of the pyrolytic self-cleaning operation of the cooking oven.

14. A cooking oven comprising:
a cabinet defining a cooking cavity; and
a door coupled to the cabinet, the door movable to, from, and between (i) a closed position that denies access to the cooking cavity from an external environment and (ii) an open position that allows access to the cooking cavity from the external environment, and the door comprising:
multiple glass panels disposed in a layered orientation and with adjacent glass panels separated by a space, the multiple glass panels comprising a terminal glass panel that is disposed closest to the external environment and furthest from the cooking cavity when the door is in the closed position, and
a deflector coupled to the terminal glass panel, the deflector disposed above the spaces between the multiple glass panels when the door is in the closed position to deflect air exiting the spaces after flowing upwards within the spaces, the deflector comprising (i) a top wall that provides a top surface that is concavely arcuate or has breaks in slope that are collectively concave and (ii) a bottom wall opposing the top wall and separated from the top wall by a vertical distance, the bottom wall additionally opposing top edges of the multiple glass panels disposed rearward of the terminal glass panel.

15. The cooking oven of claim 14, wherein
the deflector further comprises (i) a chamber bound at least in part by the top wall, the bottom wall, and the terminal glass panel and (ii) apertures into the chamber.

16. The cooking oven of claim 15, wherein
at least a portion of the apertures into the chamber of the deflector are disposed through the bottom wall of the deflector.

17. The cooking oven of claim 15, wherein
at least a portion of the apertures into the chamber of the deflector are pairs of apertures through the bottom wall of the deflector, with one aperture of each of the pairs of apertures disposed forward of the other aperture.

18. The cooking oven of claim 15, wherein
at least a portion of the apertures into the chamber of the deflector are slanted through the bottom wall rearward out of the chamber.

19. The cooking oven of claim 14, wherein
the terminal glass panel comprises a top edge, and
the top wall of the deflector terminates flush with the top edge of the terminal glass panel.

* * * * *